(12) United States Patent
Liu et al.

(10) Patent No.: US 8,373,348 B2
(45) Date of Patent: Feb. 12, 2013

(54) DYNAMICALLY CONTROLLABLE DRIVE CIRCUIT FOR PARALLEL ARRAY OF LIGHT EMITTING DIODES

(76) Inventors: Zutao Liu, ZiZhu Science Park (CN);
Kun Cheng, ZiZhu Science Park (CN);
Jianbo Sun, ZiZhu Science Park (CN);
Gang Shi, ZiZhu Science Park (CN)

( * ) Notice: Subject to any disclaimer, the term of this patent is extended or adjusted under 35 U.S.C. 154(b) by 242 days.

(21) Appl. No.: 12/777,073

(22) Filed: May 10, 2010

(65) Prior Publication Data
US 2011/0215726 A1    Sep. 8, 2011

(51) Int. Cl.
*H05B 37/02* (2006.01)
(52) U.S. Cl. .............. 315/209 R; 315/291; 315/294; 315/297; 330/9; 327/124
(58) Field of Classification Search .............. 315/291, 315/294, 297, 209 R, 307, 299, 308; 330/9; 327/124
See application file for complete search history.

(56) References Cited

U.S. PATENT DOCUMENTS

| | | | | |
|---|---|---|---|---|
| 4,931,745 A * | 6/1990 | Goff et al. | ............ | 330/9 |
| 2007/0013438 A1 * | 1/2007 | Chuang | ............ | 330/9 |
| 2007/0236285 A1 * | 10/2007 | Felder | ............ | 330/9 |
| 2009/0187925 A1 * | 7/2009 | Hu et al. | ............ | 719/327 |
| 2009/0284242 A1 * | 11/2009 | Motz | ............ | 323/313 |

* cited by examiner

*Primary Examiner* — Douglas W Owens
*Assistant Examiner* — Jonathan Cooper

(57) ABSTRACT

The present invention relates to a parallel light emitting diode ("LED") drive circuit and provides a drive circuit configured to drive a parallel array of LEDs. The drive circuit comprises: a switching control signal generator, a plurality of switches, a plurality of sampling resistors, and a plurality of chopper amplifiers. Each switch is coupled to a respective LED in the LED array. Each chopper operational amplifier configured to receive a reference voltage and a switching control signal generated by the switching control signal generator and generate an input offset voltage. Each chopper operational amplifier includes a differential amplifier including an input transistor pair and a current mirror transistor pair, of which the electrical positions can be reserved when the switching control signal is switched between a first state and a second state, wherein the offset voltage, which causes the lightness mismatching in a parallel LED circuit, can be cancelled.

16 Claims, 4 Drawing Sheets

DYNAMICALLY CONTROLLABLE DRIVE CIRCUIT FOR PARALLEL ARRAY OF LIGHT EMITTING DIODES

CROSS-REFERENCE TO RELATED APPLICATIONS

This application claims the benefit of Chinese utility model patent applications Serial No. 201020128193.6 filed on Mar. 8, 2010 and entitled "A Parallel Light Emitting Diode (LED) Drive Circuit" and Serial No. 201020128299.6 filed on Mar. 8, 2010 and entitled "A Parallel Lighting Emitting Diode (LED) Drive Circuit", which are incorporated herein be reference.

FIELD OF THE INVENTION

The present invention generally relates to a drive circuit for a parallel array of light emitting diodes (LEDs).

BACKGROUND OF THE INVENTION

Light-Emitting Diodes ("LEDs") are semiconductor light sources. With the development of high efficiency and high power LEDs, LEDs have been widely used for lighting and illumination sources. While monochrome displays can use colored light sources, such as electroluminescent back lights or colored LEDs, color displays still require a white LED as a light source to properly display color.

Using LEDs for illuminations has a wide rage of applications, such as backlighting for Liquid Crystal Display (LCD) in handheld devices (e.g. cell phone, MP3, MP4, GPS, PDAs, digital cameras, etc.), backlighting for notebook computer displays, backlighting for LCD televisions, and the like.

There are two main methods for providing a white light source: white LEDs and Cold Cathode Fluorescent Lamps ("CCFLs"). CCFLs have been used for years in notebook computer display and Televisions. However, comparing the CCFL, the advantages of using LED array as the LCD backlight source lies in, for example, high brightness, high contract ratio, fast reaction rate, wide color range, lower power consumption, long life-span, and reduced environmental pollution, to name but a few. Therefore, LEDs are becoming the preferred light source for in a variety of applications from consumer devices to industrial lighting.

There are several methods of backlighting an LCD panel using multiple LEDs or LED arrays, such as positioning white LED arrays behind the LCD panel or using Edged-LED lighting. Edged-LED lighting uses multiple white LEDs arranged around the inside frame of the display along with a special light diffusion panel designed to spread the light evenly behind the LCD panel.

LED light characteristics are generally described with a function of LED working current. To control the brightness of an LED is to control the working current of the LED. LED circuits can be driven in series or in parallel and they both have their own advantages and disadvantages.

In series connection, multiple LEDs can be connected in series with a single current limiting resistor provided the source voltage is greater than the sum of the individual LED threshold voltages. The disadvantage of series connection is that it requires a higher supply voltage and is not power and energy efficient.

In parallel connection, multiple LEDs can be connected in parallel, but the LEDs must have closely matched forward voltages in order to have equal branch currents and, therefore, generally equal brightness. Variations in the manufacturing process can make it difficult to obtain exactly equal forward voltages and, therefore, equal current or equal brightness when connecting some types of LEDs in parallel.

Therefore, it would be desirable to have a system and method for creating an LED-based lighting system that is efficient and provides a consistent and substantially uniform light and brightness.

SUMMARY OF INVENTION

The present invention overcomes the aforementioned drawbacks by providing a parallel LED drive circuit that reduces variations between drive currents for all LEDs by reducing circuitry variability, such that the drive currents for all LEDs is substantially determined by a sampling resistor, which can be accurately matched throughout the drive circuit. More particularly, the present invention provides a system and method whereby the polarity of an input offset voltage of a chopper operational amplifier used to control the drive circuits can be reversed using a switching control signal to substantially reduce affects of the input offset voltage.

In accordance with one aspect of the present invention, a drive circuit configured to drive a parallel array of LEDs is provided. The drive circuit includes a switching control signal generator, configured to generate a switching control signal having a period distributed substantially equally between a first state and a second state during the LEDs are lighting, a plurality of transistors, each configured to be coupled to a respective LED in the parallel array of LEDs and a plurality of sampling resistors, each coupled to a respective transistor in the plurality of transistors and configured to receive a drive current when the respective transistor is in a closed state. The drive circuit also includes a plurality of chopper operational amplifiers, each chopper operational amplifier configured to receive a reference voltage and the switching control signal and generate an input offset voltage configured to control a respective transistor in the plurality of transistors. Each chopper operational amplifier includes a differential amplifier including an input transistor pair and a current mirror transistor pair. The input transistor pair and current mirror transistor pair are mismatched, such that when the switching control signal is switched between a first state and a second state, electrical positions of the input transistor pair switch and electrical positions of the current mirror transistor pair switch to thereby cause a reversing of polarity of the input offset voltage of the chopper operational amplifier.

In accordance with another aspect of the invention, a parallel light emitting diode (LED) lighting system is disclosed that includes a power source configured to drive the parallel LED lighting system and an array of LEDs coupled together in parallel, each LED including an anode coupled to the power source to receive a drive current ($I_{LED}$) and a cathode. The parallel LED lighting system also includes a drive circuit having a plurality of sub-circuits each coupled to the cathode of a respective LED in the array of LEDs. The sub-circuits include a signal generator configured receive a light-adjusting square wave signal and convert the light-adjusting square wave signal to a switching control signal having a period distributed substantially equally between a first state and a second state. The sub-circuits also include a sampling resistor having a value R, a switch having a drain, gate, and source, wherein the drain is connected to the respective LED through the cathode and the source is connected to a ground through the sampling resistor, and a chopper operational amplifier. The copper operational amplifier includes a power terminal connected to a chip power source, an a negative feedback output terminal coupled to the gate of the switch, a positive feedback input terminal connected to a reference voltage (RV), a negative feedback input terminal connected to the source of the switch, and a control signal input terminal connected to a switching control signal.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
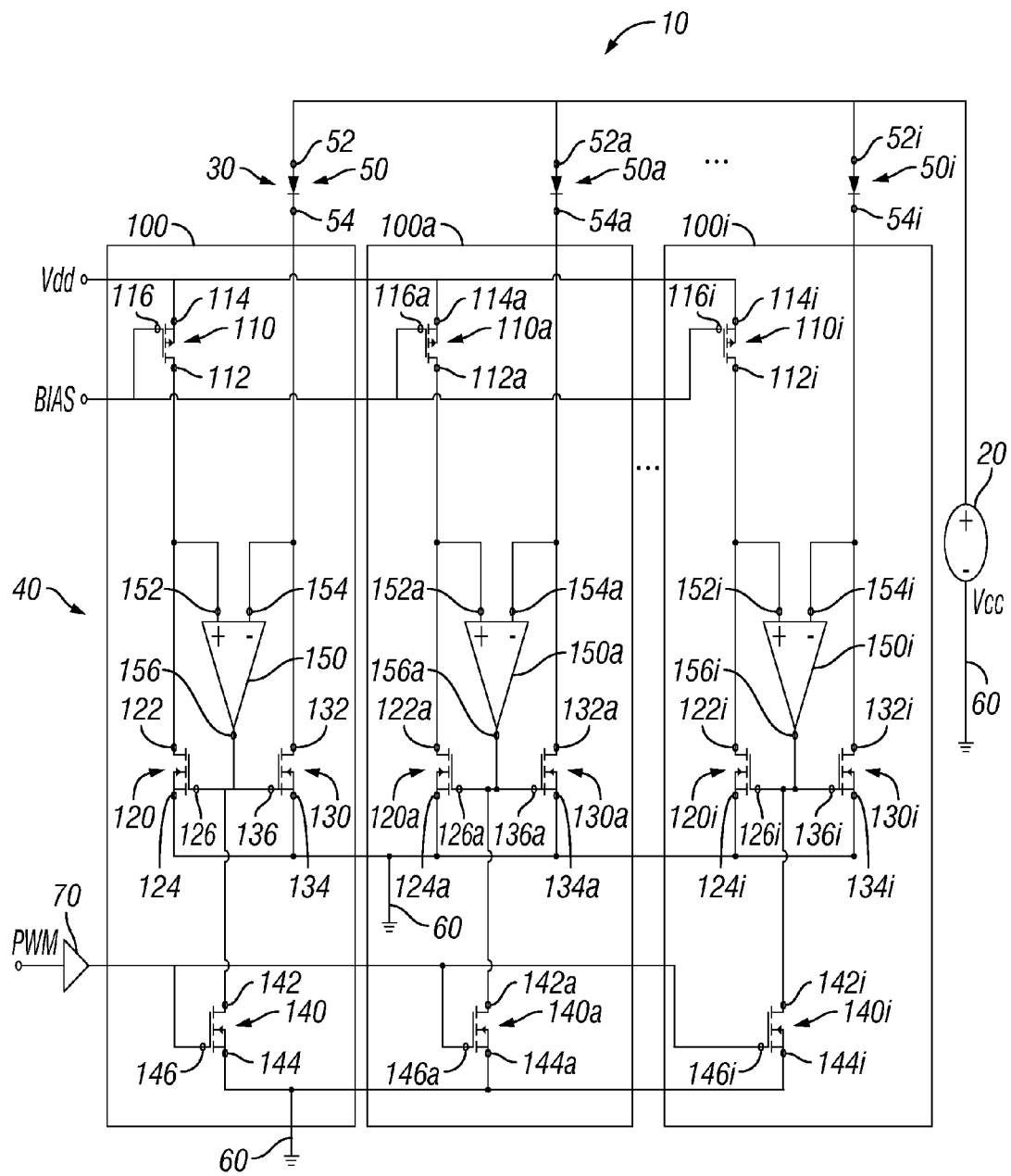
FIG. 1 is a circuit diagram showing a prior art drive circuit for a parallel array of light emitting diodes (LEDs).

FIG. 1 is a circuit diagram showing a light emitting diode (LED) lighting system 10 including a power source 20, an array of LEDs 30, and a drive circuit 40. The array of LEDs 30 includes a plurality of LEDs 50, 50a, 50i, each having respective anodes 52, 52a, 52i and cathodes 54, 54a, 54i. Though, for exemplary purposes, the array of LEDs 30 is shown with three LEDs 50, 50a, 50i, any number of LEDs may be included in the array of LEDs 30. Furthermore, the notation of "i" is intended to indicate the "ith" component and is not representative of an array containing components "a" through "i".

Each LED 50, 50a, 50i is coupled to the power source 20 through the anode 52, 52a, 52i to receive a drive current ($I_{LED}$). Also, each LED 50, 50a, 50i is coupled to the drive circuit 40 through the cathode 54, 54a, 54i. More particularly, each LED 50, 50a, 50i is coupled to a respective drive module 100, 100a, 100i of the drive circuit 40. Since all drive modules 100, 100a, 100i have substantially identical structure, the drive module 100 is discussed as an example representing all drive modules 100, 100a, 100i.

The drive module 100 includes a first transistor 110, a second transistor 120, a third transistor 130, a fourth transistor 140, and an operational amplifier 150. A cathode terminal 54 of the LED 50 and a drain electrode 132 of the third transistor 130 are commonly connected to the negative feedback input terminal of the operational amplifier 150. A source electrode 114 of the first transistor 110 is connected to a reference voltage Vdd and a gate electrode 116 of the first transistor 110 is connected to a bias voltage BIAS. A drain electrode 112 of the first transistor 110 and a drain electrode 122 of the second transistor 120 are commonly connected to the positive feedback input terminal 152 of the operational amplifier 150. A source electrode 124 of the second transistor 120 and a source electrode 134 of the third transistor 130 are commonly connected a ground 60. A gate electrode 126 of the second transistor 120 and a gate electrode 136 of the third transistor 130 are commonly connected to a output terminal 156 of the operational amplifier 150 and a drain electrode 142 of the fourth transistor 140. A source electrode 144 and a gate electrode 146 of the fourth transistor 140 are connected to the ground 60 and a light-adjusting square wave signal PWM, respectively.

The fourth transistor 140 work as an on/off switch for each drive circuit module. The light-adjusting square wave signal PWM is connected to the fourth transistor 140 through an inverter 70. When the light-adjusting square wave signal PWM is at a high voltage level, the switches 140, 140a, 140i switch on and all drive modules 100, 100a, 100i are turned on; when the light-adjusting square wave signal PWM is at a low voltage level, the switches 140, 140a, 140i switch off and all drive modules 100, 100a, 100i are turned off.

In FIG. 1, the drive current of LED 50, 50a, 50i can be matched across all drive modules 100, 100a, 100i, as long as the drain current of all first transistor 110, 110a, 110i are matched across all drive modules 100, 100a, 100i, and the drain current of the second transistor 120 and the drain current of the third transistor 130 are matched in each module 100, 100a and 100i.

The operational amplifier 150 can function so as to let the voltage at the drain electrode 122 of the second transistor 120 and the voltage at the drain electrode 132 of the third transistor 130 be matched. Since the gate electrode 126 and 136 are connected, and the source electrode 124 and 134 are both connected to the ground 60, the voltage at the drain, gate and source electrode of the second transistor 120 can be all matched with the third transistor thereof. Based on such voltage matching, the ratio of the drain current of the second transistor 120 versus the drain current of the third transistor 130 is only determined by the ratio of the channel breath length ratio of the transistor 120 versus the transistor 130 thereof. The ratio of the drive current of the ith LED 50i versus the drain current of the ith first transistor 110i can be expressed by equation (1)

$$\frac{I_{LED\_i}}{I_{110\_i}} = \frac{I_{130\_i}}{I_{120\_i}} = \frac{\frac{W_{130\_i}}{L_{130\_i}}}{\frac{W_{120\_i}}{L_{120\_i}}}, \quad (1)$$

wherein $I_{LED\_i}$ is the drive current of the ith LED 50i, $I_{110\_i}$, $I_{120\_i}$ and $I_{130\_i}$ are the drain current of the ith first transistor 110i, second transistor 120i and third transistor 130i respectively, $W_{120\_i}$ and $W_{130\_i}$ are the channel breadth of the ith second transistor 120 and the ith third transistor 130i respectively, $L_{120\_i}$ and $L_{130\_i}$ are the channel length of the ith second transistor 120 and the ith third transistor 130i respectively.

It is shown in equation (1) that the drive current $I_{LED\_i}$ is determined by the drain current $I_{110\_i}$ and the channel breath ratios $$\frac{W_{130\_i}}{L_{130\_i}} \text{ and } \frac{W_{120\_i}}{L_{120\_i}}.$$

Therefore suppose $$\frac{W_{130\_i}}{L_{130\_i}} = \frac{W_{120\_i}}{L_{120\_i}},$$

which means the channel breadth ratio of the ith second transistor 120 and the ith third transistor 130 are matched, the drive current $I_{LED\_i}$, is only determined by the drain current $I_{110\_i}$, $I_{LED\_i}=I_{110\_i}$. In this situation, as long as the drain current $I_{110\_i}$ is matched across all modules 100, 100a, 100i, the drive current $I_{LED\_j}$ can therefore be matched.

The drive circuit 10, however, has some practical problems. First, the operational amplifier 150 can have an input offset voltage $V_{offset}$, which can result in the mismatch between the drain voltage of the second transistor 120 and the drain voltage of the third transistor 130. Therefore, their current are not matched, $I_{130\_i} \ne I_{120\_i}$. Secondly, the channel breath length ratio of the third transistor 130 can be far greater than the second transistor 120 thereof, which may result in the fact that the current ratio of the third transistor 130 versus the second transistor 120 is not only determined by the ratio of their channel breadth length ratios, $$\frac{I_{130\_i}}{I_{120\_i}} \ne \frac{\frac{W_{130\_i}}{L_{130\_i}}}{\frac{W_{120\_i}}{L_{120\_i}}}.$$

Third, the current of the first transistor 110 can be mismatched across the drive modules, $I_{110\_a} \ne I_{110\_i}$. All of these problems can cause the mismatch of the drive current of the LEDs across all modules, $I_{LED\_a} \ne I_{LED\_i}$.

Figure 2:
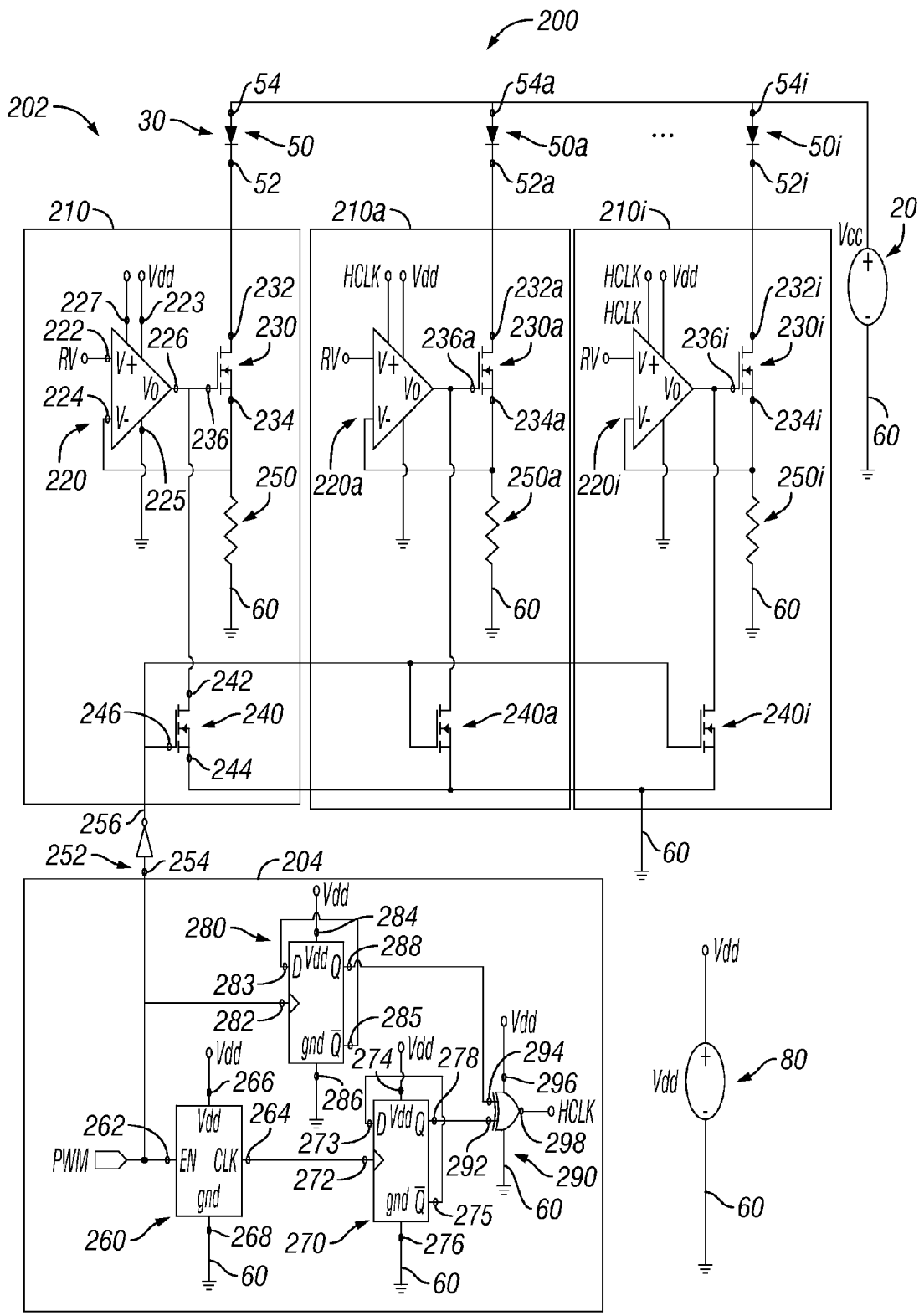
FIG. 2 is a circuit diagram showing a parallel light emitting diode (LED) lighting system in accordance with the present invention.

FIG. 2 is one configuration of a circuit diagram showing a light emitting diode (LED) lighting system 200 including a power source 20, a chip power source 80, an array of LEDs 30, and a drive circuit 202. The array of LEDs 30 includes a plurality of LEDs 50, 50a, 50i each having respective anodes 54, 54a, 54i and cathodes 56, 56a, 56i. Though, for exemplary purposes, the array of LEDs 30 is shown with three LEDs 50, 50a, 50i, any number of LEDs may be included in the array of LEDs 20. Furthermore, the notation of "i" is intended to indicate the "ith" component and is not representative of an array containing components "a" through "i". Furthermore, in FIG. 2, one of the specific circuit structures of the switching control signal generator module is illustrated in detail, as an as an example. In other configurations of the present invention, the switching control signal generator module can have the structure illustrated in FIG. 4 or other structures.

Each LED 50, 50a, 50i is coupled to the power source 20 through the anode 54, 54a, 54i to receive a drive current ($I_{LED}$). Also, each LED 54, 54a, 54i is coupled to the drive circuit 202 through the cathode 52, 52a, 52i.

The drive circuit 202 includes drive modules 210, 210a, 210i, an inverter 252, and a switching control signal generator module 204. More particularly, in drive circuit 202, each LED 50, 50a, 50i is coupled to a respective drive module 210, 210a, 210i and each drive module 210, 210a, 210i is coupled to the switching control signal generator module 204 through the inverter 252. Since all drive modules 210, 210a, 210i have substantially identical structure, the drive module 210 is discussed as an example representing all drive modules 210, 210a, 210i.

The drive module 210 includes a chopper operational amplifier 220, a first switch, such as a transistor 230, a second switch, such as a transistor 240 and a sampling resistor 290. The cathode terminal 56 of the LED 50 is connected to a drain electrode 232 of the transistor 230. A gate electrode 236 and a source electrode 234 of the transistor 230 are connected to an output terminal 226 of the chopper operational amplifier 220 and the sampling resistor 290, respectively. The sampling resistor 250 is connected to a ground 60. A positive feedback input terminal 222 of the chopper operational amplifier 220 is connected to a reference voltage RV and a negative feedback input terminal 224 of operational amplifier 220 is connected to the source electrode 234 of the transistor 230. A switching control signal terminal 227 of the chopper operational amplifier 220 is connected to a switching control signal. A positive power supply terminal 223 and a negative power supply terminal 225 of the chopper operational amplifier 220 are connected to a chip power source 80 and the ground 60, respectively. The drain electrode of the transistor 240 is connected the output terminal 226 of the chopper operational amplifier 220. The gate electrode 246 and the source electrode 224 of the transistor 240 are connected to an output terminal 256 of the inverter 252 and the ground 60, respectively. An input terminal 254 of the inverter 252 is connected to a light-adjusting square wave signal PWM.

In FIG. 2, each drive module 210, 210a, 210i is controlled by the light-adjusting square wave signal, PWM. When PWM is at a high voltage level, all drive modules 210, 210a, 210i work normally; when PWM is at a low voltage level, all drive modules 210, 210a, 210i are shut off and the current for each LED 50, 50a, 50i decreases to zero.

The switching control signal generator module 204 includes an oscillator 260, a first D flip-flop 280, a second D flip-flop 270, and a logic gate 290. The switching control signal generator module 204 is used to convert the light-adjusting square wave signal PWM into the switching control signal which functions as the chopper control signal for the chopper operational amplifier 220. In the switching control signal generator module 204, an enable terminal 262 of the oscillator 260 is connected to the light-adjusting square wave signal PWM. An clock signal output terminal 264 of the oscillator 260 is connected to an clock signal input terminal 272 of the second D flip-flop 280. An positive power terminal 266 and an negative power terminal 268 are connected to the chip power source 80 and the ground 60, respectively. A D input terminal of the second D flip-flop 273 is shorted with a negative output terminal 275 and a positive output terminal 278 is connected to the first input terminal 292 of the logic gate 290. A positive power terminal 274 and a negative power terminal 276 are connected to the chip power source 80 and the ground 60, respectively. Similarly, a D input terminal 283 of the first D flip-flop 280 is shorted with a negative output terminal 285 and a positive output terminal 288 is connected to the second input terminal 294 of the logic gate 290. A positive power terminal 284 and a negative power terminal 286 are connected to the chip power source 80 and the ground 60, respectively. A clock signal input terminal 282 of the first D flip-flop 280 is connected to the light-adjusting light-adjusting square wave signal PWM. A positive power terminal 296 and a negative power terminal 299 of the logic gate 290 are connected to the chip power source 80 and the ground 60, respectively. An output terminal 298 of the logic gate 290 outputs the switching control signal, which is the input of the switching control signal terminal 227 of the chopper operational amplifier 220.

In FIG. 2, the first D flip-flop 280 is used for frequency reduction by an even factor on the light-adjusting square wave signal PWM to generate a PWM signal, for example, with a 50% duty cycle. The second D flip-flop 270 is used for frequency reduction by an even factor on the periodic signal output by the oscillator 260 to generate a periodic signal with a 50% duty cycle. In practical applications, the D flip-flop can include one D flip-flop or a plurality of concatenated D flip-flops. Each additional D flip-flop in the concatenation connection will make the factor of frequency demultiplication timed by an extra ½ since one D flip-flop can divide frequency by ½ and the toggle frequency of switching control signal can thereby be reduced without affecting the circuit functions. Similarly, the second D flip-flop can also include a plurality of D flip-flops, which can reduce the toggle frequency of the switching control signal.

In FIG. 2, the logic gate 290 can be either an XOR or an XNOR logic gate. The logic gate 290 functions to make the switching control signal at high level in half of the total working period and at low level in the other half thereof.

It should be noted that when the frequency of the light-adjusting square wave signal PWM is high enough, its period is shorter than the time used to build the oscillator 260. In this situation, the toggle action of the switching control signal is mainly controlled by the light-adjusting square wave signal PWM. On the other hand, when the frequency of the light-adjusting square wave signal PWM is relatively low, its period is longer than the time used to build the oscillator 260. In this situation, the toggle action of the switching control signal is jointly controlled by the light-adjusting square wave signal PWM and the oscillator 260; when the duty cycle of the light-adjusting square wave signal PWM is 100%, the toggle action of said switching control signal is only controlled by the oscillator 260.

In FIG. 2, the chopper operational amplifier 220 is used to take the place of the operational amplifier 120 in system 10 in FIG. 1. As will be described in detail below, the chopper operational amplifier 220 can include a differential amplifier including an input transistor and a current mirror transistor pair. In the chopper operational amplifier 220, the input transistor pair is connected to the source electrode of respective transistor 230 and reference voltage RV, such that the input transistor pair can function as the negative and positive feedback input terminal input terminal of chopper operational amplifier 220, respectively. As will be described, the aforementioned current mirror transistor pair can function as the output tube of the first differential amplifier of chopper operational amplifier 220.

The switching control signal can have a 50% duty cycle. For example, within one total working period of the current of the LED 50, the switching control signal is at a first state, such as a high level, within half of the period and at a second state, such as a low level, within the other half thereof. In the other words, the switching control signal can be switched once between the first state and the second state within one working period of the current of the LED 50. As will be described in further detail with respect to FIG. 3, when the switching control signal is switched, the electrical positions of the inputs are designed to switch such that the polarity, positive or negative, of the input offset voltage of chopper operational amplifier 220 can be reversed once when the switching control signal is switched within one period of the working period of the LED 50. The offset voltage, such as a positive voltage, within the first half of the working period and the reserved offset voltage, a negative voltage, within the other half thereof can cancel each other and the effect of the input offset voltage of the chopper operational amplifier 220 can be eliminated, which result in that the drive current of each LED 50, 50*a*, 50*i* in each drive module 210, 210*a*, 210*i* is only determined by the reference voltage RV and each sampling resistor 250, 250*a*, 250*i*.

The reference voltage RV can be the same for all drive modules. Therefore, the drive current of each LED 50, 50*a*, 50*i* can be only determined by the resistance value of the respective sampling resistor 250, 250*a*, 250*i*. As long as all the physical characteristics, such as the resistance value, of the sampling resistors 250, 250*a*, 250*i* are accurately matched, the drive currents of all LED in each drive module can be accurately matched.

According to common knowledge of semiconductor processes, resistors can have excellent matching accuracy in semiconductor manufacturing. For example, the resistance value mismatching between the same-sized polysilicon resistors can be controlled under 0.1%. Therefore, a good matching of drive currents of all LEDs 50, 50*a*, 50*i* can be obtained in the LED lighting system 200 and the matching accuracy can be close to the matching accuracy of resistors.

It is noted that in order to avoid the LED flickering effect to a user's eyes, in the present invention, the toggle frequency of the switching control signal between the first state and the second state may be higher than 50 Hz.

Figure 3:
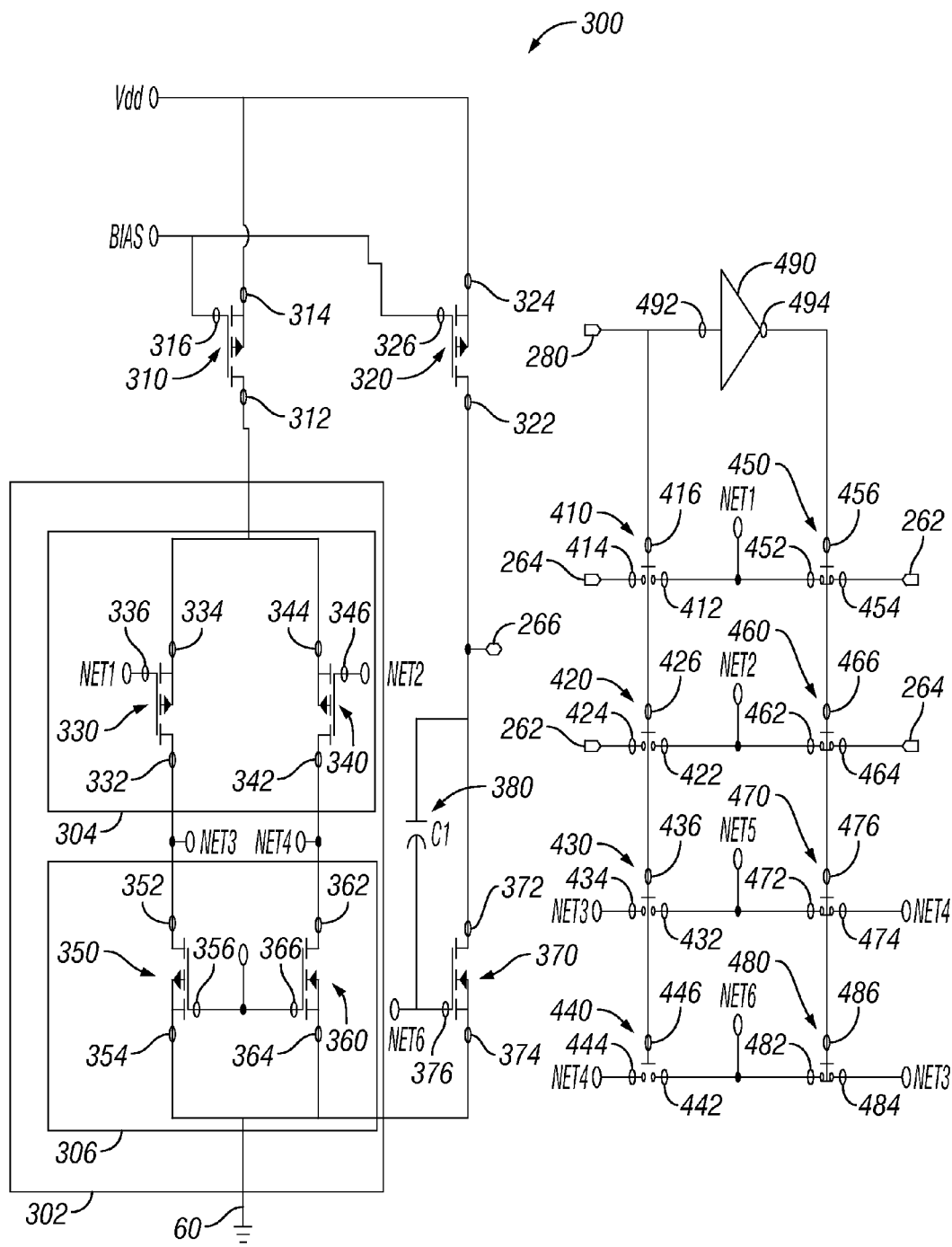
FIG. 3 is a circuit diagram showing a sub-components of the chopper operational amplifier of FIG. 2.

Specifically, FIG. 3 is a circuit diagram showing a subcomponent 300 of the chopper operational amplifier 220 of LED lighting system 200 of FIG. 2. The chopper operational amplifier can be realized through a variety of specific circuit forms. In FIG. 3, one of the specific circuit structures is described in detail as an example. In other configurations of the present invention, the chopper operational amplifier can have other circuit structures. However, regardless of the specific form of the chopper operational amplifier, the chopper operational amplifiers used by all drive modules have substantially similar functionality.

In FIG. 3, the subcomponents 300 of the chopper operational amplifier 220 include seven transistors 310, 320, 330, 340, 350, 360, 370, one operational amplifier 490, eight switches 410, 420, 430, 440, 450, 460, 470, 480, and a Miller compensation capacitor 380. The seven transistors include a first transistor 310, a second transistor 320, a third transistor 330, a fourth transistor 340, a fifth transistor 350, a sixth transistor 360 and a seventh transistor 370. The eight switches include a first switch 410, a second switch 420, a third switch 430, a fourth switch 440, a fifth switch 450, a sixth switch 460, a seventh switch 470, and an eighth switch 480.

The first transistor 310 and the second transistor 320 have commonly connected gate electrodes 316, 326, which are both connected to a gate electrode bias voltage BIAS. The first transistor 310 and the second transistor 320 have commonly connected source electrodes 314, 324, which are both connected to a working voltage Vdd. The drain electrode 312 of the first transistor 310 is connected to the source electrode 334 of the third transistor 330 and the source electrode 344 of the fourth transistor 340. The drain electrode 332 of the third transistor 330 is connected to the drain electrode 352 of the fifth transistor 350, which form NET3. The drain electrode 342 of the fourth transistor 340 is connected to the drain electrode 362 of the sixth transistor 360, which form NET4. The gate electrode 356 of the fifth transistor 350 is connected to the gate electrode 366 of the sixth transistor 360, which form NET5. The source electrode 354 of the fifth transistor 350 and the source electrode 364 of the sixth transistor 360 are commonly grounded. The drain electrode 322 of the second transistor 320 is connected to the drain electrode 372 of the seventh transistor 370. The source electrode 374 of the seventh transistor 370 is connected to a ground 60. The Miller compensation capacitor 380 is connected between the drain electrode 372 and the gate electrode of 376 of the seventh transistor 370.

The input terminal 492 of the operational amplifier 490 is connected to the switching control signal and the control terminal 416, 426, 436 and 446 of switch 410, 420, 430, and 440. The output terminal 494 of the operational amplifier 490 is connected to the control terminal 456, 466, 476, and 486 of switch 450, 460, 470, and 480.

The first contact 412 of the first switch 410 is connected to the first contact 452 of the fifth switch 450, and the common terminal NET1 of the two is connected to the gate electrode 336 of the third transistor 330. The first contact 422 of the second switch 420 is connected to the first contact 462 of the sixth switch 460, and the common terminal NET2 of the two is connected to the gate electrode 346 of the fourth transistor 340. The first contact 432 of the third switch 430 is connected to first contact 472 of the seventh switch 470, and the common terminal of the two is connected to the common gate terminal NET5 of the fifth transistor 350 and the sixth transistor 360. The first contact of 442 the fourth switch 440 is connected to the first contact 482 of eighth switch 480, and the common terminal NET6 of the two is connected to the gate electrode 376 of seventh transistor 370.

The second contact 434 of the third switch 430 is connected to the second contact 484 of the eighth switch 480, and the common terminal thereof is connected to the common drain terminal NET3 of the third transistor 313 and the fifth transistor 315. The second contact 444 of the fourth switch 440 is connected to the second contact of 474 of the seventh switch 470, and the common terminal thereof is connected to the common drain terminal NET4 of the fourth transistor 340 and the sixth transistor 360.

The second contact 411 of the first switch 410 and the second contact 464 of the sixth switch 460 is connected and both function as the negative feedback input terminal 224 of the chopper operational amplifier 220. The second contact 424 of the second switch 420 and the second contact 454 of the fifth switch 450 are connected and both function as the positive feedback input terminal 222 of the chopper operational amplifier 220. The drain electrode 372 of the seventh transistor 370 and the drain electrode 322 of the second transistor 320 are connected and can function as the output terminal 266 of the chopper operational amplifier 260.

In the first transistor 310 and second transistor 320 is the bias current mirrors. The third transistor 330 and fourth transistor 340 is the input transistor pair 304. The fifth transistor 350 and the sixth transistor 360 is the current mirror transistor pair 306. The seventh transistor 370 is the output tube.

When the switching control signal is at the first state, all of the switches 321, 322, 323 and 324 is closed and all of the switches 325, 326, 327, and 328 is open. In this situation, NET1, which is the gate electrode 336 of the third transistor 330, is connected to the negative feedback terminal 224 of the chopper operational amplifier 220, which is connected to the source electrode 234 of transistor 230 the 250 in LED lighting system 200. Further, NET2, which is the gate electrode of fourth transistor 314, is connected to the positive feedback terminal 222 of the chopper operational amplifier 220, which is connected to the reference voltage RV. Further, NET3 is connected to NET 5 and NET 4 is connected NET6, which let the sixth transistor 360 be the output tube of the first differential amplifier 302 of the chopper operational amplifier 220. In this situation, the input offset voltage of the chopper operational amplifier 220 is defined as $V_{O1}$.

When the switching control signal is at the second state, all of the switches 321, 322, 323 and 324 are open, and all of the switches 325, 326, 327, and 328 are closed. In this situation, NET1, which is the gate electrode 336 of the third transistor 330, is connected to the positive feedback terminal 262 of the chopper operational amplifier 260, which is connected to the reference voltage RV. Further, NET2, which is the gate electrode of fourth transistor 314, is connected to the negative feedback terminal 264 of the chopper operational amplifier 260, which is connected to the source electrode 234 of transistor 230 in LED lighting system 200. Further, NET4 is connected to NET5 and NET3 is connected to NET 6, which let the fifth transistor 350 be the output tube of the first differential amplifier 302 of the chopper operational amplifier 260. In this situation, the input offset voltage of the chopper operational amplifier 220 is defined as $V_{O2}$.

The input offset voltage of the chopper operational amplifier 300 is mainly caused by the mismatch of the input transistor pair 304 including the third transistor 330 and the fourth transistor 340 and the current mirror transistor pair 306 including the fifth transistor 350 and the sixth transistor 360 of the first differential amplifier thereof. When the switching control signal is switched between the first state and the second state in the drive circuit according to the present invention, the electrical positions of the input transistor pair 304 are caused to switch between each other and the electrical positions of the current mirror transistor pair 306 are caused to switch between each other. Therefore, it can be concluded that:

$$V_{O1} = -V_{O2} \quad (2).$$

For the ith drive module, when the switching control signal is at the first state, the drive current $I_{LED\_i}$ of the ith LED 50i in the ith drive module 50i in the ith drive circuit 210i can be calculated by equation (3):

$$I_{LED\_i} = \frac{(RV + V_{O1})}{R_i}; \quad (3)$$

and when the switching control signal is at low level, the drive current on the ith drive module is:

$$I_{LED\_i} = \frac{(RV + V_{O2})}{Ri}; \quad (4)$$

wherein i represents the ith drive module 210i, i=1, 2, . . . , n; $I_{LED\_i}$ represents the drive current of the ith LED 50i; $R_i$ represents the resistance value of the ith sampling resistor 250i. Since the switching control signal has a 50% duty cycle, the average drive current $I_{LED\_i(ave)}$ of the ith LED in the ith drive module is:

$$I_{LED\_i(ave)} = \frac{.5DS(RV + V_{O1})}{R_i} + \frac{.5DS(RV + V_{O2})}{R_i} = \frac{RV}{R_i}. \quad (5)$$

Equation (5) shows that the average drive current is only determined by the resistance value of the sampling resistor of the drive module and the reference voltage RV connected to the positive feedback input terminal of the chopper operational amplifier. Since the reference voltage RV input to all drive modules of the drive circuit are identical, the average drive current of the LED on each drive module is only determined by the resistance value of the sampling resistor of each drive module. Therefore, as long as a good matching accuracy is ensured for the sampling resistor of each drive module during the circuit design, the matching accuracy of the drive current of each LED in the drive circuit can be obtained.

Figure 4:
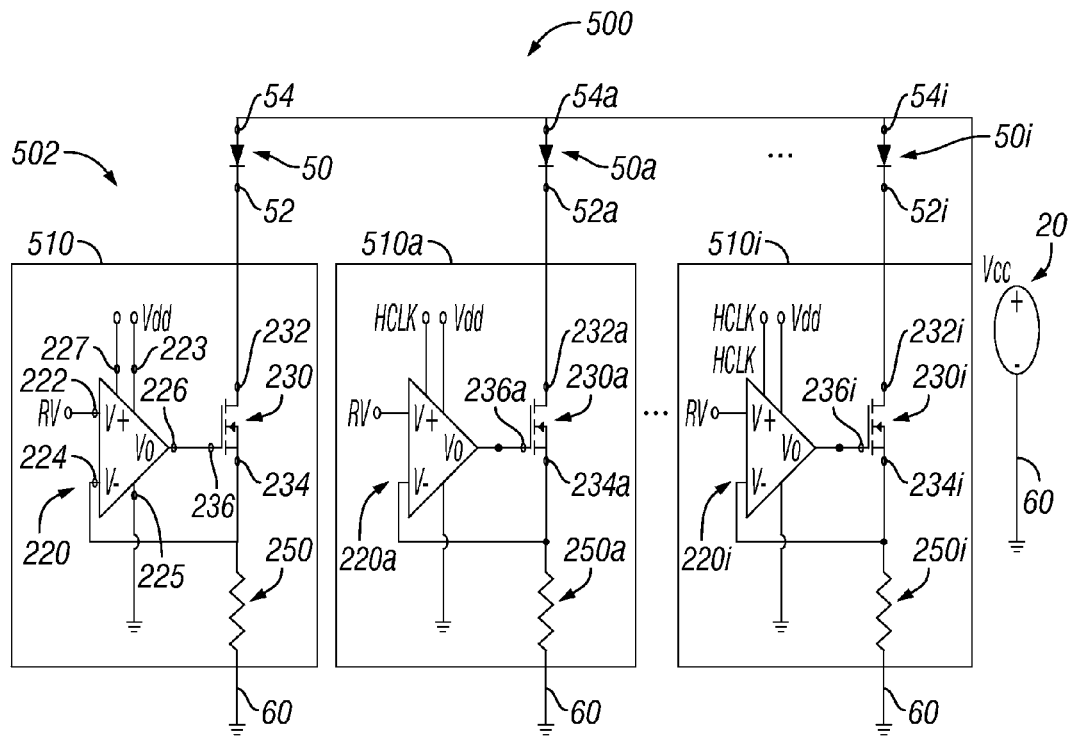
FIG. 4 is another circuit diagram showing a parallel light emitting diode (LED) lighting system in accordance with the present invention.
Figure 4:
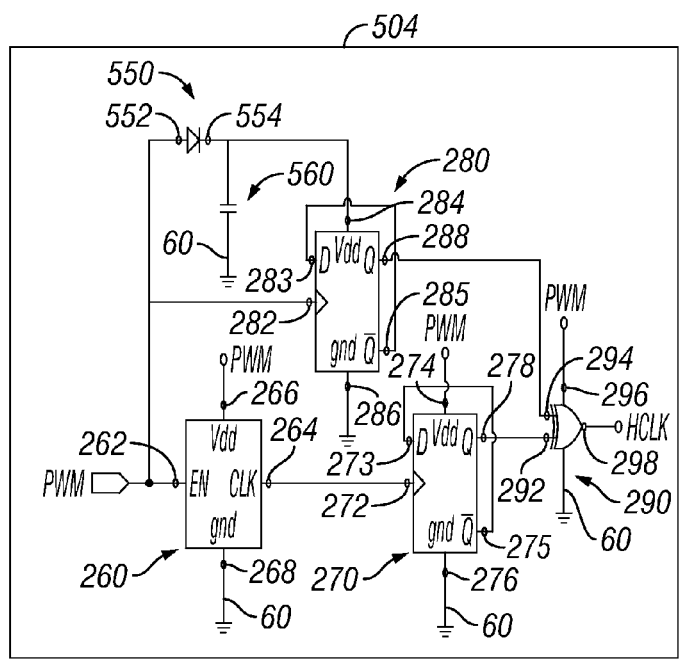

FIG. 4 is another configuration for a circuit diagram showing a light emitting diode (LED) lighting system 500 including a power source 20, an array of LEDs 30, and a drive circuit 40. The array of LEDs 30 includes a plurality of LEDs 50, 50a, 50i each having respective anodes 54, 54a, 54i and cathodes 56, 56a, 56i. Though, for exemplary purposes, the array of LEDs 30 is shown with three LEDs 50, 50a, 50i, any number of LEDs may be included in the array of LEDs 20. Furthermore, the notation of "i" is intended to indicate the "ith" component and is not representative of an array containing components "a" through "i".

Each LED 50, 50a, 50i is coupled to the power source 20 through the anode 54, 54a, 54i to receive a drive current ($I_{LED}$). Also, each LED 54, 54a, 54i is coupled to the drive circuit 202 through the cathode 52, 52a, 52i.

The drive circuit 502 includes drive modules 510, 510a, 510i, and a switching control signal generator module 504. More particularly, in drive circuit 502, each LED 50, 50a, 50i is coupled to a respective drive module 510, 510a, 510i and each drive module 510, 510a, 510i is coupled to the switching control signal generator module 504. Since all drive modules 510, 510a, 510i have substantially identical structure, the drive module 510 is discussed as an example representing all drive modules 510, 510a, 510i.

The drive module 510 includes a chopper operational amplifier 220, a switch, such as a transistor 230, and a sampling resistor 290. The cathode terminal 56 of the LED 50 is connected to a drain electrode 232 of the transistor 230. A gate electrode 236 and a source electrode 234 of the transistor 230 are connected to an output terminal 226 of the chopper operational amplifier 220 and the sampling resistor 290, respectively. The sampling resistor 250 is connected to a ground 60. A positive feedback input terminal 222 of the chopper operational amplifier 220 is connected to a reference voltage RV and a negative feedback input terminal 224 of operational amplifier 220 is connected to the source electrode 234 of the transistor 230. A switching control signal terminal 227 of the chopper operational amplifier 220 is connected to a switching control signal. A positive power supply terminal 223 and a negative power supply terminal 225 of the chopper operational amplifier 220 are connected to the light-adjusting square wave signal PWM and the ground 60, respectively.

In the configuration of FIG. 4, the switching control signal generator module 504 includes an oscillator 260, a first D flip-flop 280, a second D flip-flop 270, a logic gate 290, a diode 550, and a capacitor 560. An enable terminal 262 of the oscillator 260 is connected to the light-adjusting square wave signal PWM. An clock signal output terminal 264 of the oscillator 260 is connected to an clock signal input terminal 272 of the second D flip-flop 280. A positive power terminal 266 and an negative power terminal 268 are connected to the light-adjusting square wave signal PWM and the ground 60, respectively. A D input terminal of the second D flip-flop 273 is shorted with a negative output terminal 275 and a positive output terminal 278 is connected to the first input terminal 292 of the logic gate 290. A positive power terminal 274 and a negative power terminal 276 are connected to the light-adjusting square wave signal PWM and the ground 60, respectively. Similarly, a D input terminal of the first D flip-flop 283 is shorted with a negative output terminal 285 and a positive output terminal 288 is connected to the second input terminal 294 of the logic gate 290. A positive power terminal 284 is connected to a cathode electrode 552 of the diode 550. A negative power terminal 286 is connected to the ground 60, respectively. A clock signal input terminal 282 of the first D flip-flop 280 is connected to the light-adjusting square wave signal PWM. A positive power terminal 296 and a negative power terminal 299 of the logic gate 290 are connected to the chip power source 80 and the ground 60, respectively. An anode electrode 552 of the diode 550 is connected to the light-adjusting square wave signal PWM. The capacitor 560 is connected between the cathode electrode 554 of the diode 550 and the ground 60. An output terminal 298 of the logic gate 290 outputs the switching control signal, which is the input of the switching control signal terminal 227 of the chopper operational amplifier 220.

It is noted that the difference between the configuration in FIG. 4 and the configuration of FIG. 2 is that there is no chip power source 80, which is shown in FIG. 2 in this configuration and the light-adjusting wave signal PWM herein provides power directly to the chip. As a result, all the chips can save a power pin that other similar products must use, which can save the chip manufacturing cost. For a chip that could only provide 6-pin package, such as SOT23-6, 4 drive channels could be realized by saving a power pin.

In FIG. 4, when the light-adjusting square wave PWM is at a high voltage level, the chopper amplifier 220 works normally; when the light-adjusting square wave PWM is at a low voltage level, the output of the chopper operational amplifier 220 can only be at low level, the transistor 230 can be automatically turned off. Therefore, in this configuration, the drive circuit 502 does not need the transistor 240 or the inverter 252 which are shown in the drive circuit 202 in FIG. 2.

In FIG. 4, the diode 550 and the capacitor 560 construct a PWM rectification circuit, which rectifies the light-adjusting square wave signal PWM and then inputs the rectified signal to the first D flip-flop 280 to provide a working power source. The diode 550 can be a P-N junction semiconductor diode or be constructed by connecting a MOS tube into a diode.

Other modules which have not been described in FIG. 4, have the similar circuit structure and working principles as the drive circuit 202 in FIG. 2 and the sub-components 300 of the chopper operational amplifier in FIG. 3.

Detailed description is provided above for a parallel LED drive circuit provided by the present invention. Embodiments are used herein to describe the principles and modes of carrying out the present invention, the above description of embodiments is only to help understand the methods and core thinking of the present invention; at the same time, those skilled in the art may modify modes of carrying out and application scope of the present invention according to the spirit thereof. In summary, the contents of the specification may not be construed as restrictive to the present invention.

In present invention, compared to the prior art, a chopper operational amplifier is used to take the place of the operational amplifier according to the prior art, and a switching control signal is used as the chopper control signal of the chopper operational amplifier.

The present invention provides drive current for each LED that is only determined by the reference voltage and the sampling resistor. When the switching control signal is switched between a first state and a second state, the polarity, positive or negative, of the input offset voltage of the chopper operational amplifier can be reversed, which results in the positive and negative input offset voltages of the chopper operational amplifier cancel each other and the effect of the input offset voltage of the operational amplifier eliminate.

What is claimed is:

1. A drive circuit configured to drive a parallel array of light emitting diodes (LEDs), the drive circuit comprising:
   a switching control signal generator including:
      an oscillator configured to receive a light-adjusting square wave signal,
      a first D flip-flop having a clock input terminal configured to receive the light-adjusting square wave signal, wherein a D input terminal is shorted with a negative output terminal,
      a second D flip-flop having a clock input terminal connected to a clock signal output terminal of the oscillator, wherein a D input terminal is shorted with a negative output terminal, and a logic gate having a first input terminal connected to a positive output terminal of the second D flip-flop, a second input terminal connected to a positive output terminal of the first D flip-flop, and an output terminal configured to deliver a switching control signal having a period distributed substantially equally between a first state and a second state during the LEDs are lighting;

a plurality of switches, each configured to be coupled to a respective LED in the parallel array of LEDs;

a plurality of sampling resistors, each coupled to a respective switch in the plurality of switches and configured to receive a drive current when the respective switch is in a closed state;

a plurality of chopper operational amplifiers, each chopper operational amplifier configured to receive a reference voltage and the switching control signal and generate an input offset voltage configured to control a respective switch in the plurality of switches, wherein each chopper operational amplifier includes a differential amplifier including an input transistor pair and a current mirror transistor pair;

wherein the input transistor pair and current mirror transistor pair are mismatched, such that when the switching control signal is switched between the first state and the second state, electrical positions of the input transistor pair switch and electrical positions of the current mirror transistor pair switch to thereby cause a reversing of polarity of the input offset voltage of the chopper operational amplifier.

2. The drive circuit of claim 1 wherein the drive current is determined by:

$$\text{drive current} = \frac{0.5DS(RV + V_{O1})}{R} + \frac{0.5DS(RV + V_{O2})}{R};$$

wherein DS is a duty cycle of the enable control signal of LEDs, RV is the reference voltage, $V_{O1}$ is the input offset voltage when the switching control signal is in the first state, $V_{O2}$ is the input offset voltage when the switching control signal is in the second state, and R is a value of the sampling resistor.

3. The drive circuit of claim 2 wherein the switching control signal alternates between the first state and the second state.

4. The drive circuit of claim 3 wherein $V_{O1}$ and $V_{O2}$ are substantially equal.

5. The drive circuit of claim 4 wherein:

$$\text{the drive current} = \frac{RV}{R} \cdot DS$$

is a duty cycle of the enable control signal of LEDs.

6. The drive circuit of claim 1 wherein a frequency of the switching control signal of switching between the first state and second state is greater than 50 Hz.

7. A parallel light emitting diode (LED) lighting system comprising:
a power source configured to drive the parallel LED lighting system;
an array of LEDs coupled together in parallel, each LED including an anode coupled to the power source to receive a drive current ($I_{LED}$) and a cathode; and
a drive circuit having a plurality of sub-circuits each coupled to the cathode of a respective LED in the array of LEDs and comprising:
a signal generator including:
a first D flip-flop having a clock input terminal configured to receive a light-adjusting signal,
a second D flip-flop having a clock input terminal configured to receive a clock signal, and
a logic gate having a first input terminal connected to a positive output terminal of the second D flip-flop, a second input terminal connected to a positive output terminal of the first D flip-flop, and an output terminal configured to deliver a switching control signal having a period distributed substantially equally between a first state and a second state;
a sampling resistor having a value R;
a switch having a drain, gate, and source, wherein the drain is connected to the respective LED through the cathode and the source is connected to a ground through the sampling resistor; and
a chopper operational amplifier having a power terminal connected to a chip power source, an a negative feedback output terminal coupled to the gate of the switch, a positive feedback input terminal connected to a reference voltage (RV), a negative feedback input terminal connected to the source of the switch, and a control signal input terminal connected to a switching control signal.

8. The parallel LED lighting system of claim 7 wherein $$I_{LED} = \frac{RV}{R}.$$

9. The parallel LED lighting system of claim 7 wherein the switching control signal has a duty cycle of 50 percent if computing method use the time when LEDs are lighting as the denominator of duty cycle.

10. The parallel LED lighting system of claim 7 wherein the chopper operational amplifier comprises a bias current mirror and a differential amplifier including an input transistor pair and a current mirror transistor pair forming the negative feedback input terminal and the positive feedback input terminal of the chopper operational amplifier.

11. The parallel LED lighting system of claim 10 wherein the input transistor pair is connected to the source electrode of the switch and the reference voltage, respectively and the current mirror transistor pair forms an output tube of the differential amplifier of said chopper operational amplifier.

12. The parallel LED lighting system of claim 10 wherein input transistor pair and a current mirror transistor pair have values selected such that, when the switching control signal is switched, electrical positions switch between the input transistor pair and electrical positions switch between the current mirror transistor pair.

13. The parallel LED lighting system of claim 7 wherein the chopper operational amplifier comprises:
a first transistor and a second transistor having a common gate connection connected to a gate electrode bias voltage and a common source connection connected to a working voltage;
a third transistor and a fourth transistor having a common source connection connected to a drain electrode of the first transistor;
a fifth transistor and a sixth transistor having drain electrodes connected to a drain of the third transistor and fourth transistor, respectively and having a common gate electrode connection and a common source connection connected to ground;

a seventh transistor having a drain connected to a drain electrode of the second transistor and a source electrode connected to ground; and a Miller compensation capacitor connected between a drain electrode and a gate electrode of the seventh transistor.

14. The parallel LED lighting system of claim 7 wherein a frequency of the switching control signal is at least 50 Hz.

15. The parallel LED lighting system of claim 7 wherein the logic gate is one of an XOR gate and an XNOR gate.

16. The parallel LED lighting system of claim 7 wherein at least one of the first D flip-flop and the second D flip-flop includes at least one D flip-flop in concatenation connection.

* * * * *